US 6,661,777 B1

(12) United States Patent
Blanc et al.

(10) Patent No.: US 6,661,777 B1
(45) Date of Patent: Dec. 9, 2003

(54) PROCESS FOR CONTROLLING UPLINK PACKET TRANSMISSION IN A WIRELESS COMMUNICATION SYSTEM

(75) Inventors: Patrick Blanc, Issy les Moulineaux (FR); Rémi de Montgolfier, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/280,675

(22) Filed: Mar. 29, 1999

(30) Foreign Application Priority Data

Mar. 1, 1999 (EP) .............................. 99400497

(51) Int. Cl.$^7$ .............................. H04L 12/28
(52) U.S. Cl. ...................................... 370/252
(58) Field of Search ........................ 370/336, 252, 370/331, 231, 401, 536; 709/232

(56) References Cited

U.S. PATENT DOCUMENTS

| 4,692,945 | A | | 9/1987 | Zdunek |
| 5,070,536 | A | | 12/1991 | Mahany et al. |
| 5,574,771 | A | | 11/1996 | Driessen et al. |
| 5,671,218 | A | * | 9/1997 | I et al. .................... 370/252 |
| 5,734,646 | A | | 3/1998 | I et al. |
| 5,940,370 | A | * | 8/1999 | Curtis et al. ............ 370/231 |
| 6,028,851 | A | | 2/2000 | Persson et al. |
| 6,044,405 | A | * | 3/2000 | Driscoll et al. ......... 709/232 |
| 6,078,568 | A | * | 6/2000 | Wright et al. ........... 370/312 |
| 6,078,572 | A | * | 6/2000 | Tanno et al. ............ 370/335 |
| 6,128,322 | A | * | 10/2000 | Rasanen et al. ......... 370/536 |
| 6,157,650 | A | * | 12/2000 | Okuyama et al. ........ 370/401 |
| 6,229,795 | B1 | * | 5/2001 | Pankaj et al. ............ 370/329 |
| 6,240,083 | B1 | * | 5/2001 | Wright et al. ........... 370/348 |
| 6,320,851 | B1 | * | 11/2001 | Kim et al. ............... 370/320 |

FOREIGN PATENT DOCUMENTS

| EP | 0 765 096 A2 | 3/1997 |
| WO | WO 95/07578 | 3/1995 |
| WO | WO 98/45966 | 10/1998 |

OTHER PUBLICATIONS

Brand and Aghavmi, IEEE Journal on Selected Areas in Communications, vol. 14, No. 9, December 1996, pp. 1698–1707.*

* cited by examiner

Primary Examiner—Salvatore Cangialosi
(74) Attorney, Agent, or Firm—Sughrue Mion, PLLC

(57) ABSTRACT

The invention relates to a process for controlling uplink transmission in a wireless communication network. It comprises broadcasting to the user equipments a maximum transmission rate, so as to limit the risks of collisions and the risk that the network collapses. In the case of a CDMA network, the maximum transmission rate may be broadcast as a maximum user bit rate, in the form of a minimum spreading factor. This information may be broadcast at each frame, so that it is taken into account by a user equipment for uplink transmission in the next frame. The invention also proposes processes for controlling access of the user equipment to the resources. These processes limit the number of users that may access the resources at a given time, or limit the throughput of the user equipment at the time the user equipment accesses the resource.

20 Claims, 6 Drawing Sheets

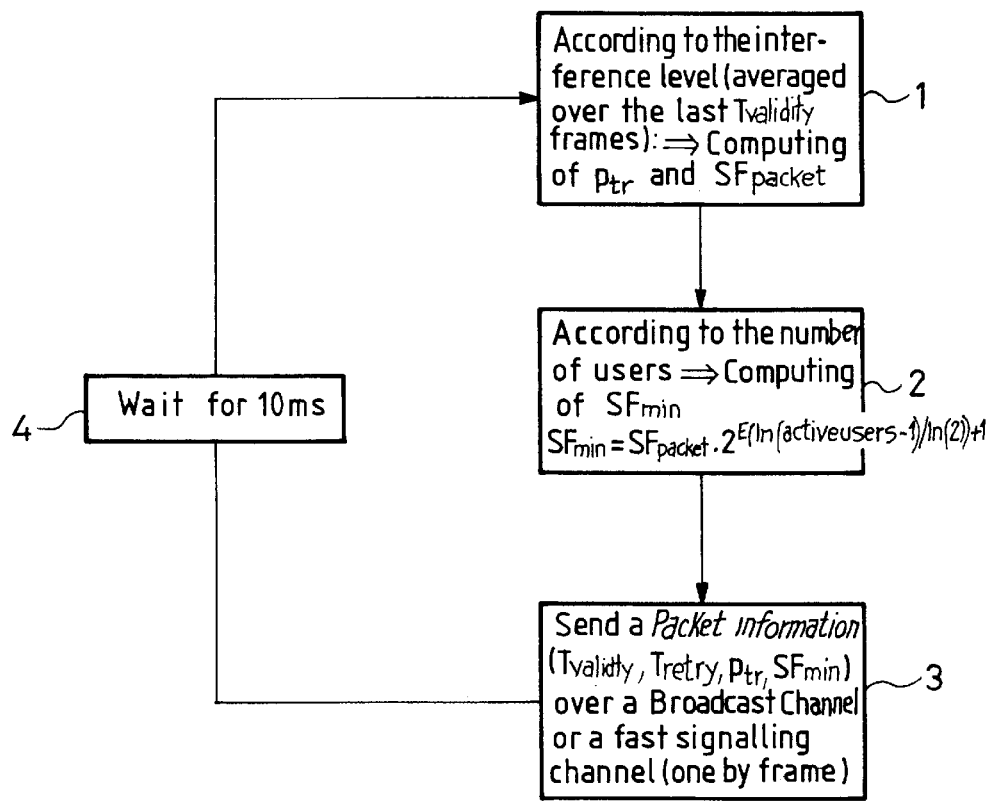
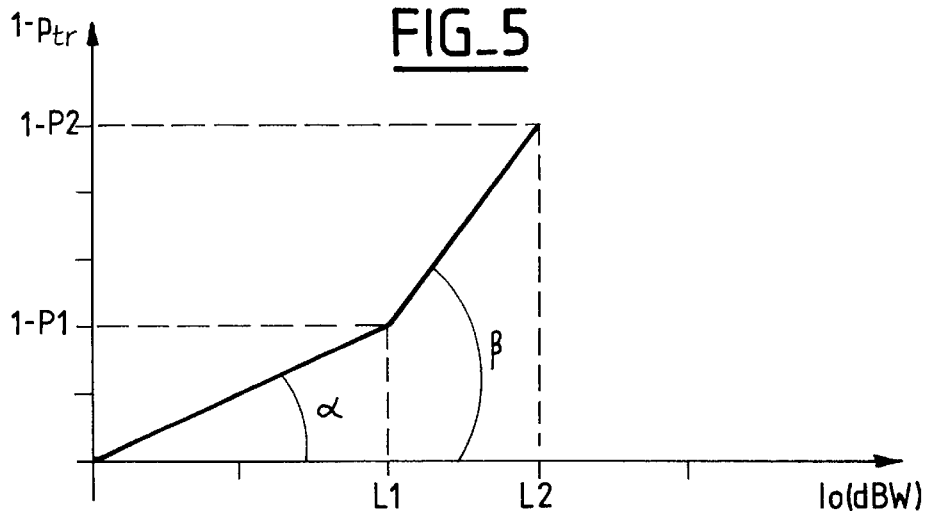

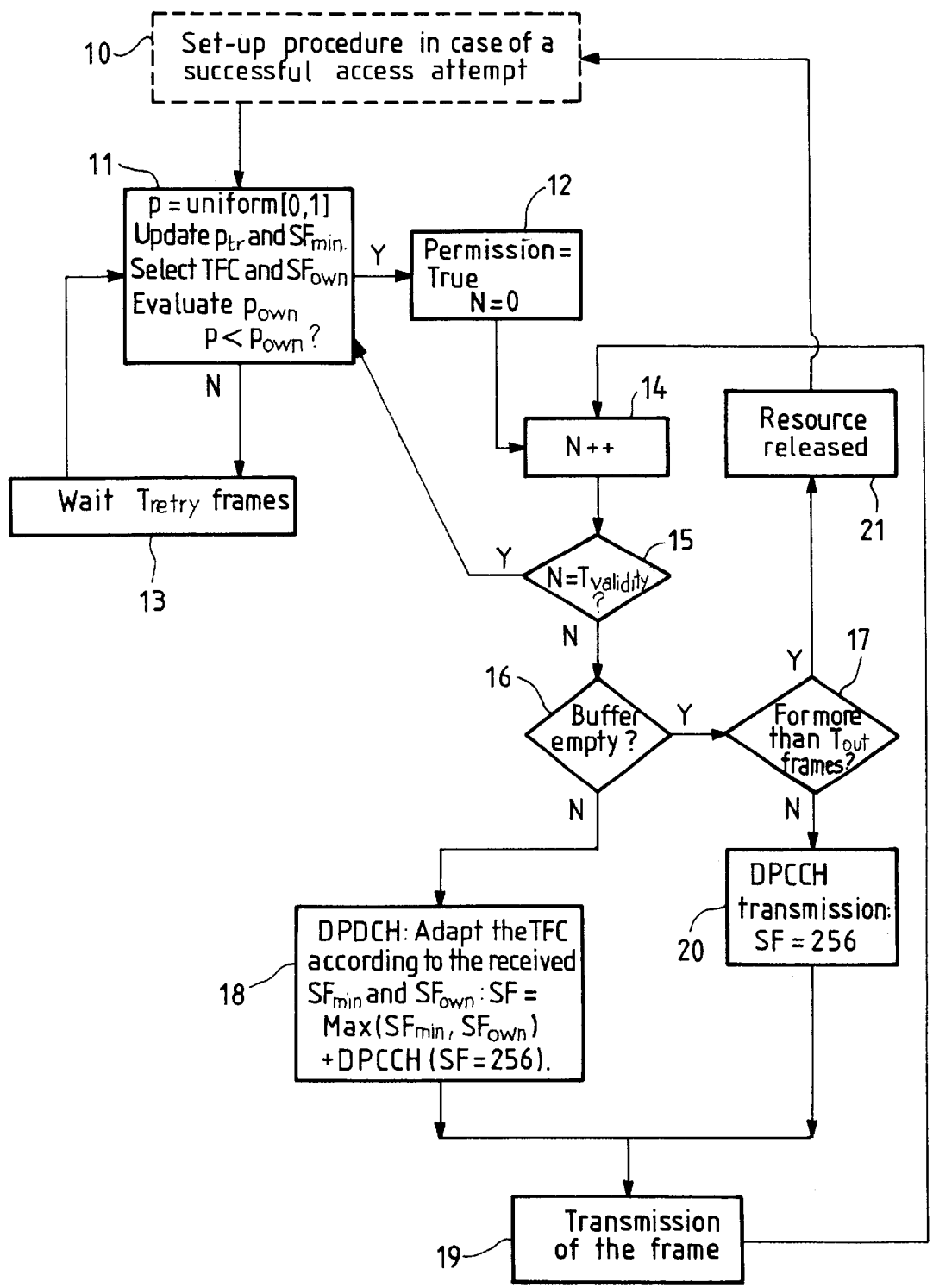
FIG_2

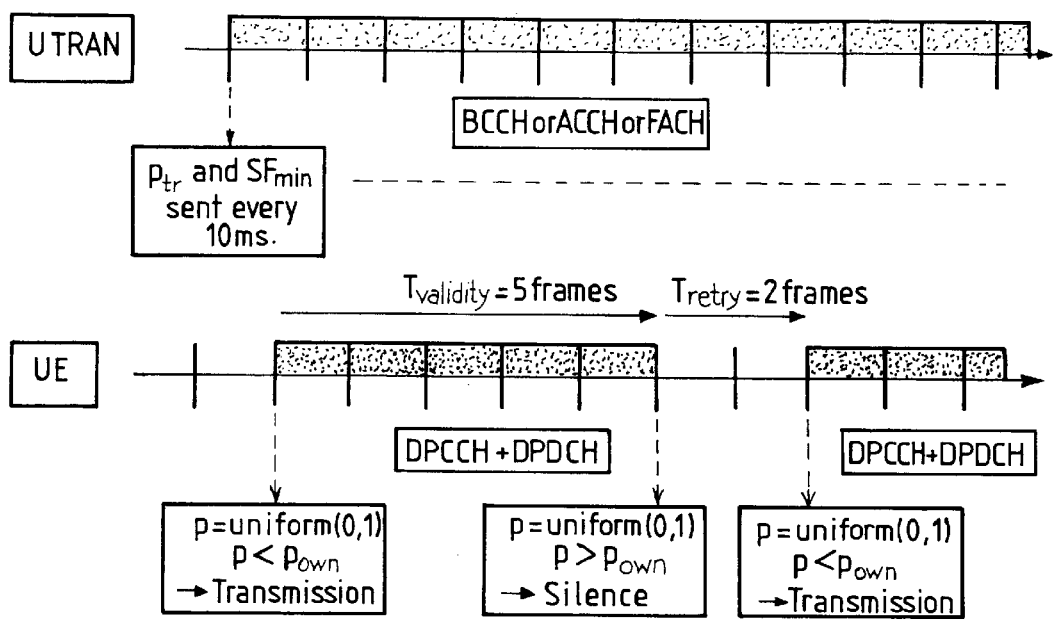
FIG_3
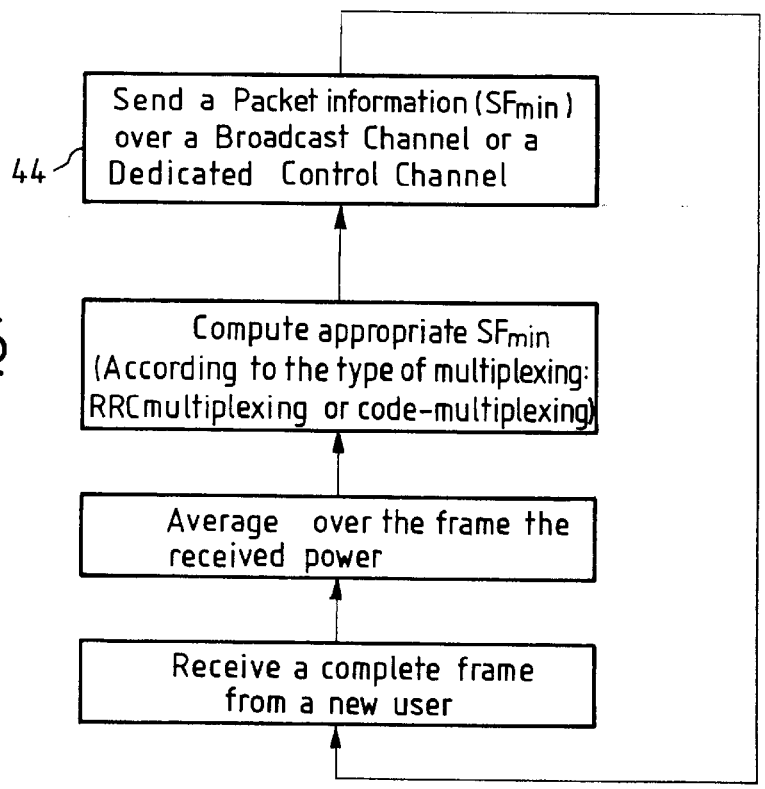
FIG_6

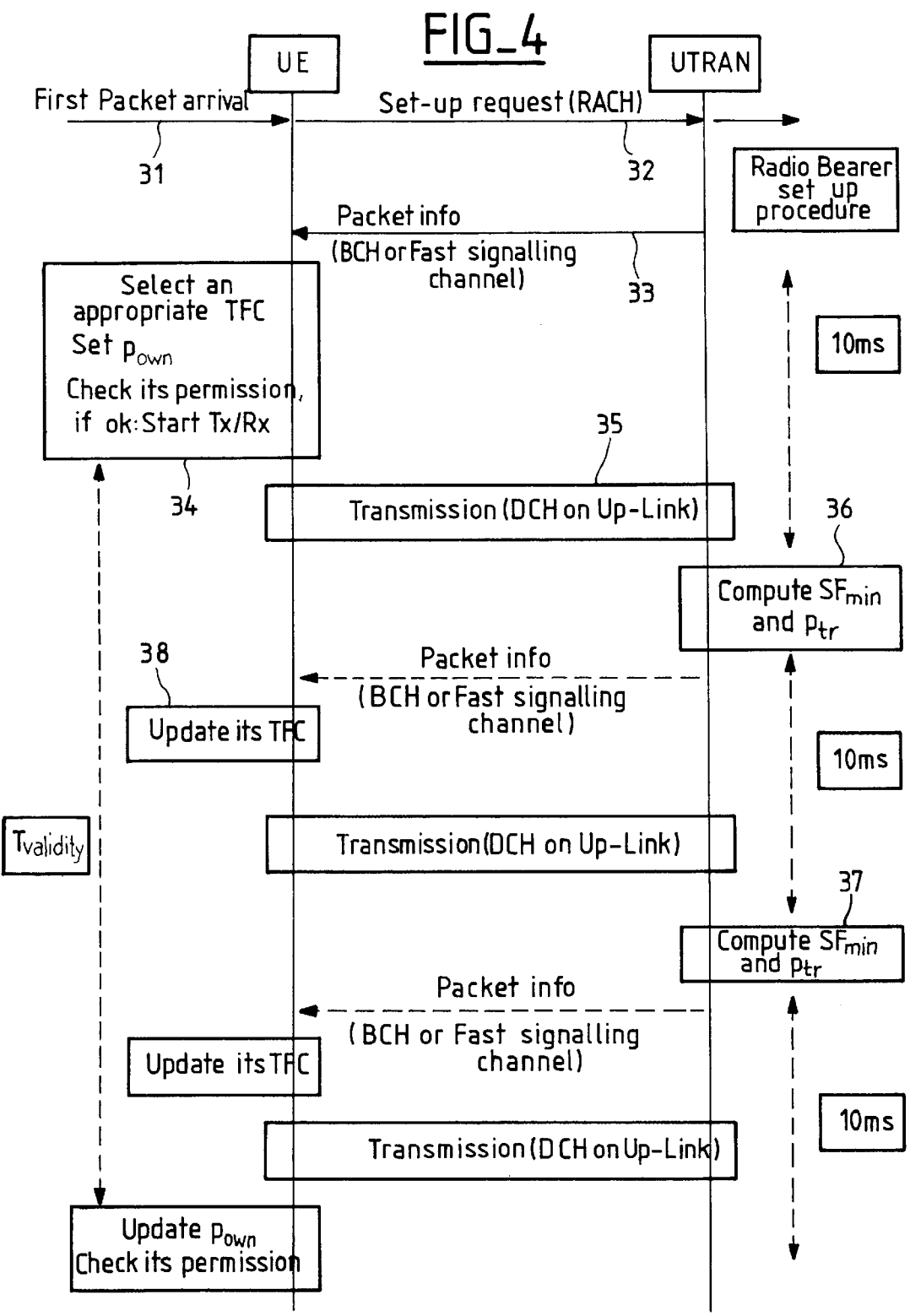

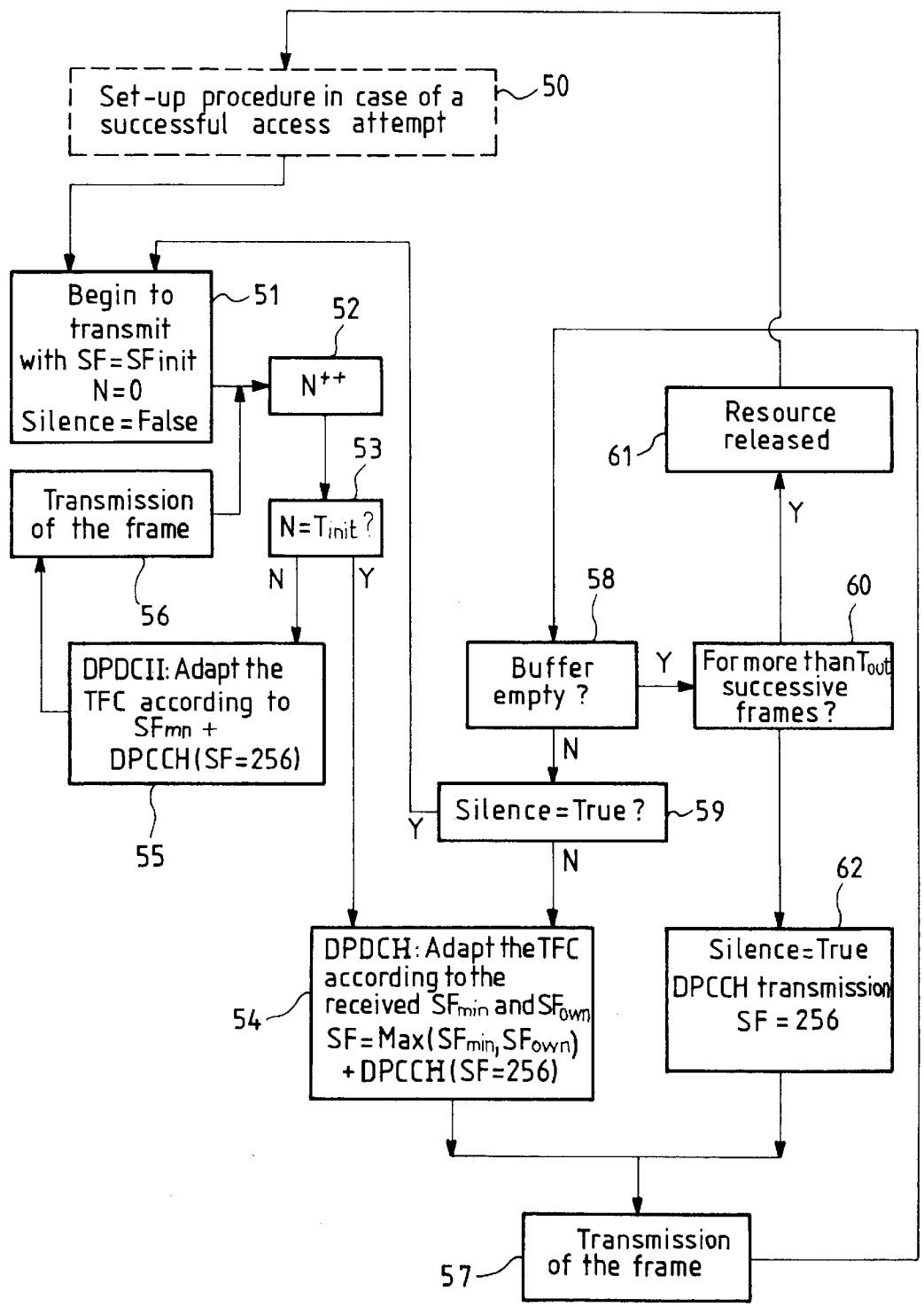
FIG_7

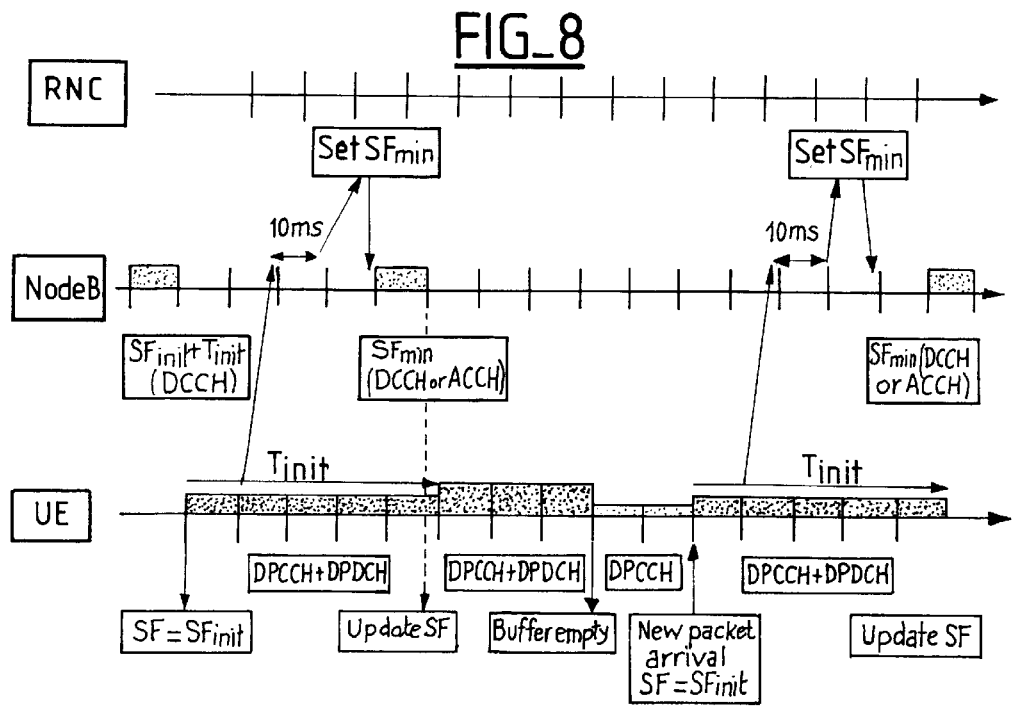
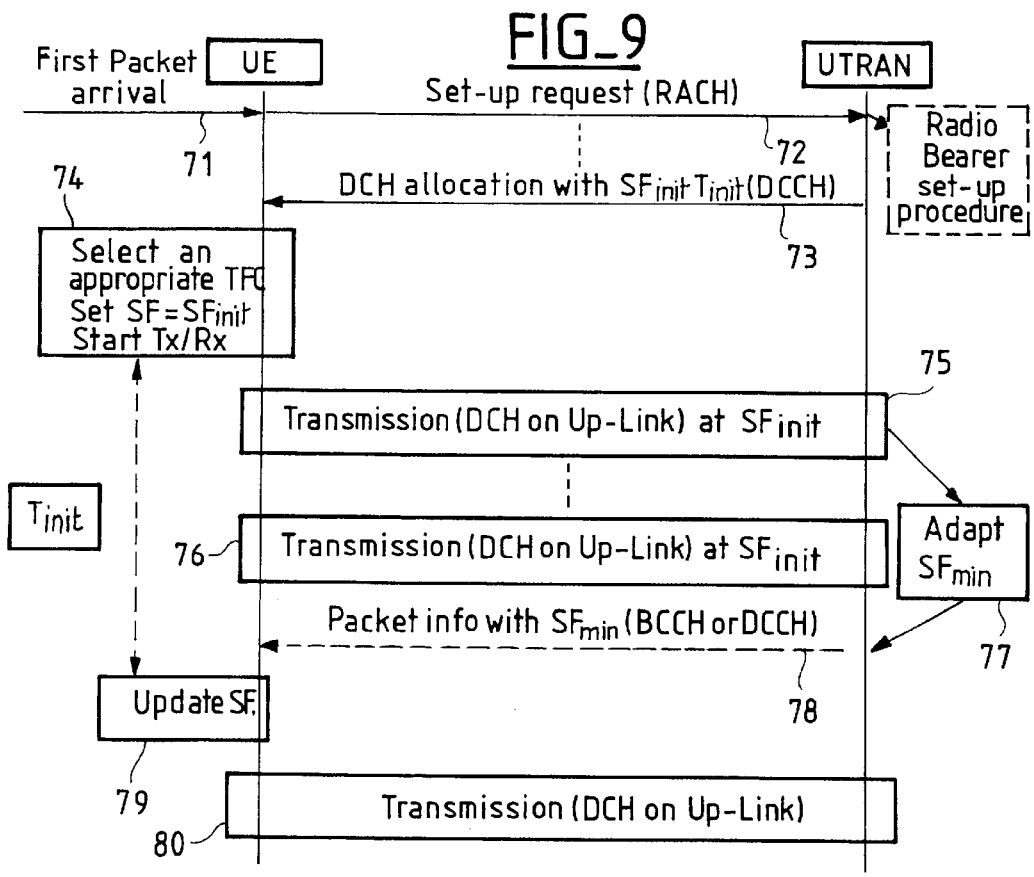

PROCESS FOR CONTROLLING UPLINK PACKET TRANSMISSION IN A WIRELESS COMMUNICATION SYSTEM

BACKGROUND OF THE INVENTION

The present invention relates to the field of wireless communication, and more specifically relates to uplink transmission in a packet service wireless communication system.

Packet services in a wireless communication network have a very bursty source of traffic. They need to have a very fast access to radio resources and transmit with a high bit rate. For packet services, since the traffic is bursty and the radio resource limited, allocating resources to the different users on a permanent basis is hardly feasible. Thus, at any given time, the network usually needs to control multiplexing of all packet users, in order to avoid overload situations; overload may occur if too many users become active at the same time with a high transmission rate. The problem is especially critical for uplink transmission in packet service, because users transmit in an uncoordinated way, according to their traffic source behaviour.

This problem is for instance discussed in EP-A-0 877 512 in the case of a CDMA (code division multiple access) based mobile communication system. The solution proposed in this document is to broadcast mobile access control information from the base station to the mobile stations. Mobile stations then transmit packet to the base station according to the timing information defined in the broadcast mobile access control information.

This solution is difficult to carry out for high bit rate communications; indeed, the base station has to manage the timing of all mobile stations, which is time consuming. In addition, broadcasting the proposed mobile access control information will also use part of the available radio resource.

WO-A-97 19525 discusses a TDMA (time division multiple access) system, according to the GSM/GPRS specification. This document discusses the use of control algorithms to modify access probabilities. One prior art solution discussed in this document is that the base station broadcasts a value p, and that any ready user transmits with a probability p during any available access burst period. In order to provide different grades of services to different classes of users, this documents suggests broadcasting different probabilities for different groups of users. Any user may select the timing of its transmission based on the broadcast probability for his group. Alternatively, access may be allowed or not in a given allowed burst period according to the comparison of a random number to the broadcast probability.

This document does not discuss CDMA-type systems, and does not suggest the use of a similar process for accessing different resources.

The problem of access to the radio resource, especially for uplink transmission was also discussed for UMTS specification (Universal Mobile Telephone Service). 'UMTS YY.03, description of UE states and procedures in connected mode', version 0.4.0, Tdoc SMG2 UMTS L23 61/99 suggests allocating dedicated channels (or DCH) to packet user, and allowing the users to transmit when they wish to. The UTRAN (UMTS Radio Access Network) may control transmission bit rate of each individual UE (User Equipment) on a slow rate basis through a RRC (Radio Resource Control) procedure. This solution results in a sub-optimal usage of radio resources and extra delay at each transmission, because resource allocation is controlled on a too slow basis. Indeed, the time necessary for sending a message from the UTRAN to the UE may reach 200 ms. Collisions can not be avoided and this may lead to a large retransmission overhead. This scheme will probably prevent packet users from transmitting at high bit rate.

Another solution for UMTS is discussed in 'Benefits of the uplink shared channel USCH', Tdoc SMG2 UMTS L23 47/99, Motorola. According to this scheme, users are allocated a DCH but a fast signalling message in downlink indicates them what bit rate to use at every frame. This solution requires too much signalling overhead, especially for a CDMA system which does not require explicit assignment of physical resources.

'Performance of a joint CDMA/PRMA protocol for mixed voice/data transmission for third generation mobile communication', A. E. Brand, A. H. Aghvami, IEEE Journal on selected areas in communications, vol.14, No9, December 1996 suggest an uplink protocol for mobile communication systems. According to this protocol, a permission probabilities are sent on each downlink packet, for different slots of the next frame. Permission probability for a slot in a given frame is set according to the periodic load in the same slot of the previous frame.

This solution discusses simultaneous periodic and random loads, and suggests setting permission probabilities according to periodic load only. It is therefore not adapted to controlling packet service uplink transmission.

SUMMARY OF THE INVENTION

The invention provides a solution to contention of user equipment or mobiles stations for packet service uplink transmission in a CDMA wireless communication network. It provides a simple and efficient solution for lowering interference, and for optimising use of the radio resource.

More specifically, the invention provides a process for sharing radio resources between user equipments on the uplink of a packet service wireless communication system, comprising:

in the network, computing a maximum transmission rate for user equipments, and broadcasting this maximum transmission rate to user equipments;

in a user equipment, transmitting with a transmission rate lower that the last received broadcast maximum transmission rate.

Preferably, the maximum transmission rate is broadcast every frame.

In one embodiment of the invention, the maximum transmission rate is identical for all user equipments.

In another embodiment of the invention, the maximum transmission rate is class dependent.

The process may also comprise:

in the network, computing a probability for user equipments, and broadcasting this probability to user equipments;

in a user equipment, transmitting only if a random value is lower than the last received broadcast probability.

Preferably, the process comprises:

in the network, computing a probability for user equipments, and broadcasting this probability to user equipments;

in a user equipment, if the requested transmission rate is lower than the broadcast transmission rate, computing a user probability higher than the last received broadcast probability, as a function of the last received broadcast probability, of the last received broadcast maximum transmission rate and of the transmission rate required by the user equipment, and transmitting only if a random value is lower than the last computer user probability.

In one embodiment of the invention, the probability is broadcast every frame.

In another embodiment of the invention, the probability is identical for all user equipments.

In yet another embodiment, the probability is class dependent.

Preferably, the step of transmitting is carried out for a validity time period after it is determined that the random value is lower than the last received broadcast probability.

In another embodiment, a user equipment is not allowed to transmit for a retry time period after it is determined that the random value is not lower than the last received broadcast probability.

In one embodiment of the invention, the step of transmitting is started at a first transmission rate for a time period, and is continued at a second transmission rate after the lapse of said time period.

In this case, the maximum transmission rate may be broadcast to user equipments transmitting at said first transmission rate.

It is also possible for the maximum transmission rate to be broadcast only when it is computed anew.

The invention also provides a wireless communication system carrying out this process, and a user equipment carrying out the user side steps of the process.

BRIEF DESCRIPTION OF THE DRAWING

A wireless communication system embodying the invention will now be described, by way of non-limiting example, and in reference to the accompanying drawings, where:

FIG. 1 is a flowchart of the procedure in the UTRAN according to a first embodiment of the invention;

FIG. 2 is a flowchart of the procedure in the UE according to the first embodiment of the invention;

FIG. 3 is a representation of the timing of the packet admission control according to the first embodiment of the invention;

FIG. 4 is a flow diagram between UTRAN and UE according to the first embodiment of the invention;

FIG. 5 is a graph of a possible probability function;

FIG. 6 is a flowchart of the procedure in the UTRAN according to a second embodiment of the invention;

FIG. 7 is a flowchart of the procedure in the UE according to the second embodiment of the invention;

FIG. 8 is a flow diagram between UTRAN and UE according to the second embodiment of the invention;

FIG. 9 is a representation of the timing of the packet admission control according to the second embodiment of the invention;

DETAILED DESCRIPTION OF THE INVENTION

The invention suggests broadcasting a maximum bit rate to the different user equipments, so that user equipments may adapt if necessary their bit rate for transmission in the next frame. This allows optimised sharing of the radio resource between the different user equipments.

Contrary to the prior art solutions, in which interference is limited by limiting the number of transmitting user equipments—be it on a statistical basis or on an individual basis—the invention suggests limiting the bit rate of the users; in other words, instead of limiting the number of users for avoiding interference, the invention suggests limiting the user of available radio resource by each of the active user equipments.

In addition the invention suggests various processes for controlling access of user equipments to the radio resource. These processes optimise use of the resource on a frame basis, without adding too much signalling overhead. Controlling access to radio resource ensures that sufficient time is given to the network to adapt the broadcast bit rate so as to take into account new users. In the first embodiment of the invention, this is done on a statistical basis, so that the number of new UEs appearing at a given time is known in advance. In the second embodiment of the invention, this is done by limiting the transmission rate of UEs at the beginning of a transmission, so that the resource grabbed by new users is actually limited.

The invention notably applies to UMTS and is described in the rest of the present specification with reference to this type of wireless communication network. It should however be understood that the invention is not limited to this preferred embodiment, and applies to other types of CDMA packet service wireless communication system, or more generally to transmission systems where a limited resource has to be shared among users. The invention applies particularly to packet service, where the source of traffic is bursty.

UMTS is a CDMA system; as known to the person skilled in the art, is such a system, a spreading factor SF is defined as the ratio W/R of the chip rate W to the transmission rate R of coded signal. Each UE in UMTS is allocated a number of possible codes having different spreading factors. In addition each UE is provided with a user-specific scrambling factor, which is combined to one of the codes for transmission. Transmission rate of a given UE is controlled by selecting the spreading factor used at a given time; the higher the spreading factor, the lower the transmission rate.

FIGS. 1 to 5 disclose a first embodiment of the invention. In this embodiment, maximum transmission rate is broadcast to the different UE; in addition, access to the resource is controlled on a statistical basis. In the preferred embodiment of these figures, transmission rate is broadcast at every frame, so as to be taken into account for the next frame.

FIG. 1 is a flowchart of the procedure in the UTRAN in a first embodiment of the invention. This procedure may be carried out in the base station or Node B in the UMTS specification; it may also be carried out in the base station controller or RNC (Radio Network Controller) in UMTS.

At step 1, a transmission rate $SF_{packet}$ allocated to packet users is computed, based on interference level in the previous frames. This transmission rate is normally calculated taking into account the transmission rate for other types of services, such as voice service, if any, and the resource that may be requested by new users. The transmission rate $SF_{packet}$ is computed in a way known per se.

As discussed above, access of the different UEs to the radio resource may also be controlled. This is not a requirement for carrying out the broadcast of the transmission rate according to the invention; however, controlling access to the radio resource makes it easier for the network to compute $SF_{packet}$ for the next frame; in other words, controlling access to the resource makes it possible to allow a higher $SF_{packet}$ to active users. Any solution known per se may be used for controlling access of the UEs to the resource. In the present embodiment, the invention proposes a new scheme for access control; the invention suggests broadcasting on access probability $p_{tr}$, and letting the UEs determine whether they may access the resource or not according to this probability. FIG. 5 shows a graph of a possible function for comptuign $p_{tr}$ according to the interference level.

As discussed in relation to FIG. 2, when a UE accesses the resource, it is allowed to continue transmitting for a period of $T_{validity}$; it is therefore preferable to compute the interference level $1_o$ on the last $T_{validity}$ period, for the computation of $SF_{packet}$ and $p_{tr}$.

At the end of step one, the UTRAN has computed $SF_{packet}$ and $p_{tr}$. The process then passes to step 2.

In step 2, a maximum transmission rate $SF_{min}$ for the UEs is computed, based on the total allocated transmission rate $SF_{packet}$ and on the number of active users; one solution may consist in sharing uniformly the resource between all active users. If the transmission rate allocated to packet users is $SF_{packet}$, the transmission rate broadcast to the UEs may be computed as:

$$SF_{min} = SF_{packet} \cdot 2^{1+E(ln(activeusers-1)/ln(2))}$$

In this formula, "active users" is the number of active users; it may simply be the number of active users in the previous frame, that is the number of UEs using the resource for uplink transmission of packets. The number of active users may be computed with a more elaborate solution, e. g. if a UE is allowed to continue transmitting for a period of $T_{validity}$, need not be taken into account for the computation of users. In other words, a UE active in the previous frame, but which has been active for a period of $T_{validity}$, need not be taken into account in the number of active users for the next frame.

It is also possible to use a different scheme for sharing the total transmission rate $SF_{packet}$: for instance, the transmission rate could be shared according to the location of the UEs, according to their class if classes are defined, etc.

At the end of step 2, the UTRAN has computed a UE maximum transmission rate $SF_{min}$. The process then passes to step 3.

In step 3, the maximum transmission rate is broadcast to the UEs. This may be done in UMTS over a Broadcast Channel, or over a Fast Signalling Channel. The broadcast information should be sent to the different UEs as fast as possible, so that it may be taken into account by the UE for the next frame. The transmission rate is preferably broadcast to the UEs in every frame.

At the same time, access control information, such as the access probability $p_{tr}$ may be broadcast to the UE; in addition, information such as timing information for the transmission by UE may be broadcast. For instance, the periods $T_{validity}$, $T_{out}$ and $T_{retry}$ discussed below may be broadcast at the same time as $SF_{min}$. This information need not necessarily be broadcast at each frame, or on the same timing basis as the $SF_{min}$ and $p_{tr}$ information.

After step 3, the process passes to step 4, where the UTRAN waits for 10 ms before the process again passes to step 1.

Thus, the UTRAN broadcasts, preferably on a frame basis, the maximum transmission rate allowed to each UE.

FIG. 2 is a flowchart of the procedure in the UE according to the first embodiment of the invention; it shows that the UE, for an uplink transmission, adapts its transmission rate according to the maximum transmission rate $SF_{min}$ received from the UTRAN. FIG. 2 also discloses the access resource control according to the first embodiment of the invention.

Access to the radio resource according to the first embodiment of the invention depends on the broadcast probability $p_{tr}$. More specifically, when a UE wishes to access the radio resource, it compares a random number to the broadcast probability. Resource may only be accessed when the random number is less than the broadcast probability. In other words, permission to transmit depends statistically on the broadcast probability $p_{tr}$.

In addition, the invention propose the following timing rules:

transmission may continue for a time period of $T_{validity}$ after permission is granted; thus, permission does not have to be requested at each and every frame;

when permission is refused, the UE waits for a period of time of $T_{retry}$ before requesting again access to the resource;

when no activity occurs during a period of $T_{out}$, the dedicated channel is released.

$T_{validity}$ and $T_{retry}$ are set by the UTRAN; they may be set on a permanent basis, in which case they do not need to be broadcast. They could also be adapted by the network in relation to the activity statistics of real time services. This allows the network to maintain priority for real time services. These parameters, as well as $T_{out}$ may also be adapted according to the packet service activities.

At step 10, the UE is at the beginning of a call, or has to sent a packet after a long period, that is after a period longer than $T_{out}$ has elapsed. In other words, the UE is not allocated any transmission channel; a radio-bearer set-up procedure is carried out in step 10, so as to provide the UE with an indication of the resource it may try to access. In packet service, this resource is not allocated to the UE on a permanent basis, and permission to transmit is controlled as discussed above. In UMTS, the result of a successful attempt in step 10 is that the UE is provided with a DPCCH (Dedicated Physical Control Channel).

At step 11, the UE updates the values of $p_{tr}$ and $SF_{min}$, broadcast by the network. According to the value of $SF_{min}$, the UE selects a transmission rate; for a CDMA system, this amounts to selecting a spreading factor among the spreading factors that are allowed to the UE. In UMTS, a TFC (Transport Format Combination) is selected. The selected transmission rate $SF_{own}$ may be lower than the one allowed in the broadcast information. The user bit rate may indeed be limited by transmitter power or the UE may have a small amount of data to transmit, thus not requiring the maximum allowed bit rate.

In addition, the UE computes a random number p, which is used for determining whether permission to transmit is granted. This random number is compared to the received $p_{tr}$ to determine if transmission may occur. In a preferred embodiment, a UE may be granted permission to transmit more easily if the transmission rate $SF_{own}$ it intends to use is lower that the broadcast transmission rate $SF_{min}$: in this case, the UE computes a probability $p_{own}$, starting from $p_{tr}$, $SF_{min}$ and $SF_{own}$. The formula for the computation may be:

$$P_{own} = P_{tr}^{SFmin/SF}$$

The UE then determine whether it may transmit. For this the random probability p is compared to the broadcast probability $p_{tr}$ or to the computed $p_{own}$. If p is less than $p_{tr}$, or where applicable less than $p_{own}$, the UE is allowed to transmit, and the process passes to step 12. If this is not the case, the UE is not allowed to transmit, and the process passes to step 13.

In step 13, the UE has a DPCCH, but was not allowed to transmit; because of the statistical contention; as discussed above, the UE waits for a period of $T_{retry}$ before trying again to access the resource. The process thus passes again to step 11 after a period of $T_{retry}$ has elapsed. During this period, access to the physical resource remains possible, due to the fact that the UE still transmits on the DPCCH, with the lowest possible transmission rate.

In step 12, the UE is allowed to transmit. A variable N for counting the period of $T_{validity}$ is set to 0. The process then passes to step 14.

At step 14, the variable N is increased of one. The process then passes to step 15.

At step 15, it is determined whether the period $T_{validity}$ has elapsed. If this is the case, the UE should determine again whether it is authorised to transmit. The process thus passes again to step 11. If $T_{validity}$ has not elapsed, the process passes to step 16.

In step 16, the UE has determined that it was allowed to transmit, and has transmitted for a duration less than $T_{validity}$. It is then determined whether the transmission buffer is empty or not. If the transmission buffer is empty, the process passes to step 17. Else, the process passes to step 18.

In step 18, the UE prepares a frame for transmission. The information in this frame is sent at rate of $SF_{own}$ on the DPDCH (Dedicated Physical Data Channel); $SF_{own}$ is updated every time the UE received the broadcast maximum transmission rate $SF_{min}$ from the network; the frame also contains signalling for the DPCCH, at the lowest possible transmission rate. Once the frame is ready, the process passes to step 19.

In step 17, the transmission buffer is empty. The process then counts the number of frames during which the transmission buffer remains empty. While this number is less than the time period $T_{out}$, the process prepares for every frame signalling for the DPCCH, at the lowest possible speed, see step 20. Else, once the transmission buffer remains empty for a period of time of more than $T_{out}$, the UE stops signalling on the DPCCH, so that the resource is released, step 21.

At step 21, the process goes back to step 10, where the UE waits for the beginning of a call, or for a new packet.

After step 20, where a signalling frame is prepared, the process passes to step 19.

At step 19, the frame prepared in step 18 or 20 is sent.

During the entire process, the UE receives at every frame the transmission rate information sent by the network.

FIG. 2 thus shows that the UE adapts its transmission rate according to the broadcast maximum rate. It also shows the contention mechanism used in the first embodiment of the invention for statistically controlling access to the resource.

FIG. 3 is a representation of the timing of the packet admission control according to the first embodiment of the invention; the top of FIG. 3 shows the frame timing in the network; as discussed in reference to FIG. 1, the network broadcasts every frame the $SF_{min}$ and $p_{tr}$ information, on the BCH, the ACCH (Associated Control Channel) or the FACH (Forward Access Control Channel). The bottom of FIG. 3 shows activity in the UE; in the example, $T_{validity}$ corresponds to 5 frames, and $T_{retry}$ to 2 frames. On FIG. 5, the UE starts transmitting in the second frame, on the DPCCH and on the DPDCH, for a period of $T_{validity}$. The second attempt to transmit fails, so that the UE remains silent for a time period of $T_{retry}$. The third attempts is again successful, so that the UE again transmits for a period of $T_{validity}$—which is not completely represented on the figure.

FIG. 4 is a flow diagram between UTRAN and UE according to the first embodiment of the invention; the figure shows the first packet arrival 31 on the UE. The UE, as discussed in step 10 of FIG. 2, sends a set-up request 32 on the RACH (Random Access Channel); the network then starts the radio-bearer set-up process.

The network then sends back to the UE a packet information at 33 on the BCH or on a fast signalling channel, for indicating the DPCCH and DPDCH to be used by the UE.

At 34, the UE then determines whether it is allowed to transmit, and if this is the case, transmits on the dedicated channel, as shown in 35.

Every frame, the network computes and broadcasts the maximum transmission rate $SF_{min}$, and the probability $p_{tr}$, see 36 and 37. According to the maximum transmission rate allowed by the network, the UE adapts its transmission rate, see 38 on FIG. 4.

FIG. 4 thus summarises the process of the invention.

FIG. 5 is a graph of a possible probability function, which may be used according to the invention for the computation of $p_{tr}$. The vertical axis show the probability $p_{tr}$ and the horizontal axis shows level of interference $I_o$ for the previous frames, or, the total power level $l_o$ received on the uplink. In the example, the probability varies linearly, with two thresholds $P_1$ and $P_2$, which correspond to levels $L_1$ and $L_2$. The probability decreases when the interference increases; the decrease $dp_{tr}/dl_o$ is slow in a first region where the level is low, up to a value of interference level of $L_1$; the decrease $dp_{tr}/dl_o$ is then higher when the level increases, as the resources is more and more used.

The following figures have proved efficient in a simulation; values for L assume a noise level of −132 dBW.

| | |
|---|---|
| $L_1$: | −126 dBW |
| $L_2$: | −122 dBW |
| $P_1$: | 0,3 |
| $P_2$: | 0 |
| $T_{validity}$: | 50 frames |
| $T_{retry}$: | 50 frames |
| $T_{out}$: | 50 frames |

The system simulations carried out with these figures have shown that interference level is kept under a threshold of −96 dBm (6 dB above noise level), while allowing uncoordinated transmission for packet users. In the simulation, there were 15 packet users, the transmission of whom corresponded to a web session, as disclosed in ETSI UMTS 30.03, Selection procedures for the choice of radio transmission technologies of the UMTS.

The first embodiment of the invention disclosed above mainly requires a fast signalling channel for broadcasting UTRAN information to packet users, preferably on a frame basis. The amount of information depends on the number of user classes—if user classes are provided—but may in all cases remain quite small. The transmission probability $p_{tr}$ may be quantified on 4 bits, and the maximum transmission rate or minimum spreading factor $SF_{min}$ may be quantified on 4 bits; in addition, the transmission validity $T_{validity}$ may be quantified on 6 bit. This leads to around 8 bits per user class and per frame for broadcasting $p_{tr}$ and $SF_{min}$; for frames where $T_{validity}$ or $T_{retry}$ are broadcast, around 20 bits may be necessary.

This information may be transported on the BCCH, on the ACCH (Associated Control Channel defined for the DSCH) or even on the FACH. If the ACCH is already used for DLTPC bits, it might be convenient to put the DUPAC (Dynamic Uplink Packet Admission Control) signalling information on the same logical and transport channels in order to reduce multicode reception requirements.

Otherwise, this may be transported on the BCCH, provided this channel has a sufficient payload and can be received during data transmission.

The complete transmission procedure on the radio interface could then be specified, as part of a MAC/RRC (Medium Access Control/Radio Resource Control) protocol. On the UE side, specific requirements may be specified for the transmission of packet data according to the proposed scheme. The UE is using a DCH in a particular manner and this may need to be defined as a specific transport channel.

The solution of the invention provides a very flexible control mechanism for packet transmission in uplink direction, without too much signalling overhead. Compared to prior art solutions, this scheme provides better control than the pure DCH allocation option, and equivalent flexibility in control than the USCH, but with much less signalling overhead.

A second embodiment of the invention is now discussed. In this embodiment, as in the first embodiment of the invention, the maximum transmission rate is broadcast. However, a different process is used for controlling access to the resource. Instead of using a probability control, the second embodiment proposes that the UE starts transmitting at a low transmission rate $SF_{init}$, during a time period $T_{init}$. This time period may be used by the network to change the maximum transmission rate, in order to take into account new active users. After the time period of $T_{init}$, the UE transmits at the allowed transmission rate $SF_{min}$. As in the first embodiment, the UE releases the resource when it is not used for a time period of $T_{out}$.

In other words, the second embodiment of the invention provides a different computation of the total available transmission rate $SF_{packet}$. The solution of the first embodiment for sharing this transmission rate between the different active users applies similarly in the second embodiment.

FIG. 6 is a flowchart of the procedure in the UTRAN according to a second embodiment of the invention; this procedure may be carried out in the base station or Node B in the UMTS specification; it may also be carried out in the base station controller or RNC (Radio Network Controller) in UMTS. As for the first embodiment, set-up of the call, that is allocation of a given DPDCH and DPCH is not discussed in FIG. 6.

At step 41, a complete frame is received from a new user. The process passes to step 42.

At step 42, the received power is averaged over the last frame, so as to compute an estimate of the level of interference. The process passes to step 43.

At step 43, based on the number of active user—which just increased—the network computes a maximum transmission rate $SF_{min}$ for each user. As above, one simple way to do this is to share uniformly the possible transmission rate among all active users. This can be done by selecting $SF_{min}$ so that the following formula is as close as possible to $I_{othreshold}$:

$$I_o + \Sigma_{user} Pr^*(SF_{init}/SF_{min} - 1)$$

where $I_o$ is the averaged interference level determined in step 42,

Pr is the power received from a UE within the cell, averaged over the last received frame;

$I_{othreshold}$ is the maximum level of interference that may be accepted in the system.

It is also possible to use a different scheme for sharing the total transmission rate: for instance, the transmission rate could be shared according to the location of the UEs, according to their class if classes are defined, etc.

Once the new $SF_{min}$ is computed, the process passes to step 44.

In step 44, the new $SF_{min}$ is broadcast over to the user equipments. This may be done as in the first embodiment of the invention.

At the same time, access information may be broadcast, and for instance the time period $T_{init}$ during which the UE transmits with a low transmission rate, the transmission rate $SF_{init}$ used during this time period, or the time period $T_{out}$ after which the resource is released when there is no transmission from the UE. This information need not necessarily be broadcast at each frame, or on the same timing basis as $SF_{min}$.

After step 44, the process passes to back to step 41, and the UTRAN awaits that a new user appears.

Thus, the UTRAN broadcasts, preferably every time it changes, or on a frame basis, the maximum transmission rate allowed to each UE.

FIG. 7 is a flowchart of the procedure in the UE according to the second embodiment of the invention; it shows that the UE, for an uplink transmission, starts transmitting at a limited transmission rate $SF_{init}$ for a duration $T_{init}$, before transmitting at the broadcast transmission rate. This allows the network to adapt the maximum transmission rate $SF_{min}$ according to the number of active users, in order to take into account the new users. This duration may also be user-class dependent.

As in the first embodiment, the resource is released when the UE does not transmit for a time period $T_{out}$.

At step 50, the UE is at the beginning of a call, or has to sent a packet after a long period, that is after a period longer than $T_{out}$ has elapsed. In other words, the UE is not allocated any transmission channel; a radio-bearer set-up procedure is carried out in step 50, so as to provide the UE with an indication of the resource it may try to access. In UMTS, the result of a successful attempt in step 50 is that the UE is provided with a DPCCH (Dedicated Physical Control Channel).

At step 51, the UE sets up a count variable N for counting the time $T_{init}$. A variable silence is set at a logical False value. The process then passes to step 42.

In step 52, N is increased by one. The process then passes to step 53.

In step 53, it is checked whether N equals or is higher than $T_{init}$. If this is the case, the process passes to step 54; else, it passes to step 55.

In step 55, it is ascertained that the UE started transmitting less than $T_{init}$ ago. Transmission should therefore continue at the first transmission rate $SF_{init}$. The TFC on the DPDCH is set so as to respect the limit of $SF_{init}$ for the transmission rate; in addition, signalling occurs at a low transmission rate on the DPCCH. The frame is prepared for transmission, and the process passes to step 56.

In step 56, the frame prepared in step 55 is transmitted. The process then passes to step 52.

This loop corresponds to the transmission of the first frames, at a transmission rate of $SF_{init}$, for a duration of $T_{init}$.

In step 54, it is ascertained that the duration $T_{init}$ has elapsed. TFC on the DPDCH is set so as to respect the limit of $SF_{min}$ for the transmission rate; in addition, signalling occurs at a low transmission rate on the DPCCH. The frame is prepared for transmission, and the process passes to step 57.

In step 57, the frame prepared in step 54 or 62 is transmitted. The process then passes to step 58.

In step 58, it is determined whether the transmission buffer is empty or not. If this is not the case, the process passes to step 59, else, it passes to step 60

In step 59, it is checked whether the Silence variable is at a True logical level; if this is the case, a new packet has arrived in the buffer, and transmission should start again at $T_{init}$. The process passes again to step 51. If the Silence variable is a false level, the same packet is being sent, and the process passes to step 54, where a new frame is prepared In step 60, it is determined that the buffer is empty, so that the packet is finished. While this number is less than the time period $T_{out}$, the process prepares for every frame signalling for the DPCCH, at the lowest possible speed, see step 62. Else, once the transmission buffer remains empty for a period of time of more than $T_{out}$, the UE stops signalling on the DPCCH, so that the resource is released, step 61.

At step 61, the process goes back to step 50, where the UE waits for the beginning of a call, or for a new packet.

After step 62, where a signalling frame is prepared, the process passes to step 57.

FIG. 7 assumes that the number of frames to send at least corresponds to the duration $T_{init}$. Since $SF_{init}$ is normally low enough that the new user transmitting at $SF_{init}$ does not create too much interference, this assumption is likely to be fulfilled. FIG. 7 does not show the timing of frames; it is clear that the UE waits for the duration of a frame before sending a new frame.

FIG. 7 shows that the UE starts transmitting a packet at $SF_{init}$, for a duration $T_{init}$, and then transmits the rest of the packet at the broadcast transmission rate; this is the case for any new packet. In addition, when no frame is transmitted for a duration of $T_{out}$, the resource is released. During all the process, the UE receives at every frame the transmission rate information sent by the network.

FIG. 8 is a representation of the timing of the packet admission control according to the second embodiment of the invention; the top of FIG. 3 shows the frame timing in the RNC, where calculation of $SF_{min}$ is taking place. The middle of FIG. 8 shows the Node B, where frames from new users are received; each time it receives frame from a new user at the transmission rate $T_{init}$, the Node B requests a computation of the maximum transmission rate from the RNC. When it receives the new transmission rate, the Node B broadcasts it to the user equipments; this information may be broadcast on the BCH, the ACCH or the FACH. The bottom of FIG. 8 shows activity in the UE; in the example, $T_{init}$ corresponds to 5 frames. On FIG. 5, the UE starts transmitting in the second frame, on the DPCCH and on the DPDCH at $SF_{init}$, for a period of $T_{init}$. It then transmits at $SF_{min}$ for three frames. The UE is then silent for two frames; after these two frames, the UE starts again transmitting a new packet at $SF_{init}$.

FIG. 9 is a flow diagram between UTRAN and UE according to the first embodiment of the invention; the figure shows the first packet arrival 71 on the UE. The UE, as discussed in step 50 of FIG. 7, sends a set-up request 72 on the RACH (Random Access Channel); the network then starts the radio-bearer set-up process.

The network then sends back to the UE a packet information 73 on the BCH or on a fast signalling channel, for indicating the DPCCH and DPDCH to be used by the UE.

At 74, the UE then determines the TFC for transmission at $SF_{init}$, and transmits on the dedicated channel, as shown in 75 and 76.

When the networks receives the first frame at $SF_{init}$, as shown in 77, it computes the new $SF_{min}$, which is sent to the UE at 78.

After $T_{init}$ has elapsed, the UE updates its transmission rate according to the maximum broadcast transmission rate, see 79, and broadcasts the end of the packet accordingly, see 80. Of course, the $SF_{min}$ may change during transmission of the rest of the packet, and the transmission rate would be changed accordingly.

The following figures have proved efficient in a simulation; values assume a noise level of −132 dBw.

| | |
|---|---|
| $SF_{init}$: | 128 |
| $T_{init}$: | 5 frames |
| $T_{out}$: | 50 frames |

The system simulations carried out with these figures have shown that interference level is kept under a threshold of −96 dBm (6 dB above noise level), while allowing uncoordinated transmission for packet users. In the simulation, there were 15 packet users, as in the simulation for the first embodiment.

The requirements for carrying out the process of the second embodiment are similar the ones for carrying out the process of the first embodiment. The advantages are also similar. As compared to the first embodiment, the second embodiment makes it possible to start transmitting immediately—even if it is with a reduced transmission rate. In addition, it is not necessary in the second embodiment to broadcast the transmission rate information at every frame, but simply when a user is detected.

It is clear to the person skilled in the art that the preferred embodiments disclosed above may be changed. For instance, the transmission rate need not be broadcast at every frame; it could be sent to the UEs every second frame, or at a lesser interval, according to the expected behaviour of the UEs.

The invention preferably applies to packet service, where the source of traffic is bursty; it may also apply to other types of services, where traffic is not fully foreseeable.

In the preferred embodiments, only one class of UEs is defined. In this respect, the network only broadcasts one transmission rate. It is also possible to define several classes of UEs, and to allow different transmission rates for the different classes of UEs. One solution is to broadcast the transmission rate for each class of UEs; another solution is to broadcast a transmission rate, and to allow the UEs to compute their own transmission rate based on the broadcast transmission rate, according to their class.

It is also clear that in the first embodiment, the probability $p_{tr}$ could be changed into $1-p_{tr}$, in which case transmission would only occur when the random number is higher than the probability. This case is intended to be covered in the wording "the random number is lower than the broadcast probability".

In the second embodiment, when the number of user is limited, it may not be necessary to change the maximum transmission rate. In this case, it may be possible not to broadcast this transmission rate. Like the $SF_{min}$, the initial transmission rate $SF_{init}$ and the corresponding duration $T_{init}$ could be user-class dependent.

What is claimed is:

1. A process for sharing radio resources between user equipments on an uplink of a packet service wireless communication system, comprising:

in the network, computing a maximum transmission rate ($SF_{min}$) for user equipments, and broadcasting this maximum transmission rate to user equipments;

in a user equipment, transmitting with a transmission rate lower than the last received broadcast maximum transmission rate.

2. The process of claim 1, wherein the maximum transmission rate is broadcast every frame.

3. The process of claim 1, wherein the maximum transmission rate is identical for all user equipments.

4. The process of claim 1, wherein the maximum transmission rate is class dependent.

5. The process of claim 1, further comprising:
in the network, computing a probability ($p_{tr}$) for user equipments, and broadcasting this probability to user equipments;
in a user equipment, transmitting only if a random value (p) is lower than the last received broadcast probability ($p_{tr}$).

6. The process of claim 1, further comprising:
in the network, computer a probability ($p_{tr}$) for user equipments, and broadcasting this probability to user equipments;
in a user equipment, if a requested transmission rate is lower than the broadcast transmission rate, computing a user probability ($p_{own}$) higher than a last received broadcast probability ($p_{tr}$), as a function of the last received broadcast probability ($p_{tr}$), the last received broadcast maximum transmission rate ($SF_{min}$), and the transmission rate required by the user equipment, and transmitting only if a random value (p) is lower than the last computed user probability ($p_{own}$).

7. The process of claim 5, wherein the probability is broadcast every frame.

8. The process of claim 5, wherein the probability is identical for all user equipments.

9. The process of claim 5, wherein the probability is class dependent.

10. The process of claim 5 wherein the step of transmitting is carried out for a validity time period ($T_{validity}$) after it is determined that the random value (p) is lower than the last received broadcast probability ($p_{tr}$).

11. The process of claim 5, wherein a user equipment is not allowed to transmit for a retry time period ($T_{retry}$) after it is determined that the random value (p) is not lower than the last received broadcast probability ($p_{tr}$).

12. The process of claim 1 wherein the step of transmitting is started at a first transmission rate ($SF_{init}$) for a time period ($T_{init}$), and is continued at a second transmission rate (SF) after the lapse of said time period ($T_{init}$).

13. The process of claim 12, wherein the maximum transmission rate is broadcast to user equipments transmitting at said first transmission rate.

14. The process of claim 12, wherein the maximum transmission rate is broadcast only when it is computed anew.

15. A wireless communication system carrying out a process for sharing radio resources user equipments on an uplink of a packet service wireless communication system, said process comprising:
in the network, computing a maximum transmission rate ($SF_{min}$) for user equipments, and broadcasting this maximum transmission rate to user equipments;
in a user equipment, transmitting with a transmission rate lower than the last received broadcast maximum transmission rate.

16. A user equipment comprising means for transmitting with a transmission rate lower than a last received broadcast maximum transmission rate, wherein the last received broadcast maximum transmission rate was received from and computed by a network.

17. A network equipment comprising:
means for computing a maximum transmission rate for at least one user equipment, and
means for broadcasting the maximum transmission rate to said at least one user equipment.

18. The network equipment according to claim 17, wherein the maximum transmission rate is broadcast every frame.

19. The network equipment according to claim 17, wherein the maximum transmission rate is identical for all user equipment.

20. The network equipment according to claim 17, wherein the maximum transmission rate is class dependent.

* * * * *